(12) United States Patent
Houser et al.

(10) Patent No.: US 11,156,281 B2
(45) Date of Patent: Oct. 26, 2021

(54) AXLE ASSEMBLY WITH LUBRICATION PUMP

(71) Applicant: Dana Heavy Vehicle Systems Group, LLC, Maumee, OH (US)

(72) Inventors: Jordan M. Houser, Toledo, OH (US); Mark W. Leber, Holland, OH (US); Marcus W. Schmidt, Swanton, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/747,011

(22) Filed: Jan. 20, 2020

(65) Prior Publication Data

US 2020/0248790 A1 Aug. 6, 2020

Related U.S. Application Data

(60) Provisional application No. 62/800,102, filed on Feb. 1, 2019, provisional application No. 62/881,974, filed on Aug. 2, 2019.

(51) Int. Cl.
*F16H 48/42* (2012.01)
*F16H 48/22* (2006.01)
*F16H 48/27* (2012.01)

(52) U.S. Cl.
CPC ............. *F16H 48/22* (2013.01); *F16H 48/27* (2013.01); *F16H 48/42* (2013.01); *F16H 2048/423* (2013.01)

(58) Field of Classification Search
CPC ............. B60K 17/3515; F16H 57/0409; F16H 57/0483; F16H 57/0434; F16H 57/0436; F16H 48/24

USPC ......................................................... 180/247
See application file for complete search history.

(56) References Cited

U.S. PATENT DOCUMENTS

| 4,479,395 | A | * | 10/1984 | Riley | ..................... B60K 17/16 74/15.82 |
| 4,730,514 | A | * | 3/1988 | Shikata | ............... B60K 17/3465 192/70.12 |
| 4,841,803 | A | * | 6/1989 | Hamano | ............... B60K 17/344 180/247 |
| 6,702,703 | B2 | | 3/2004 | Gervais, III | |
| 6,855,083 | B1 | | 2/2005 | Wagle | |
| 7,210,566 | B2 | | 5/2007 | Baxter, Jr. | |
| 8,491,289 | B2 | | 7/2013 | Showalter | |
| 8,858,381 | B2 | | 10/2014 | Trost | |
| 9,028,358 | B2 | | 5/2015 | Valente | |

(Continued)

*Primary Examiner* — Sherry L Estremsky
(74) *Attorney, Agent, or Firm* — Marshall & Melhorn, LLC

(57) ABSTRACT

An axle assembly having a pair of axle half shafts and an axle housing defining a sump. The axle assembly further includes a first clutch assembly including a first half and a second half, wherein the first half is selectively engaged to the second half. The axle assembly also includes a second clutch assembly disposed adjacent to the first clutch assembly, wherein the second clutch includes a gear and the gear is selectively engaged with the second half of the first clutch assembly. Yet further, the axle assembly includes a lubrication pump mounted in the axle housing and drivingly coupled to the second clutch assembly; a spring mounted between the first half and the second half of the first clutch assembly; and a bearing disposed between the spring and the second half of the first clutch assembly.

20 Claims, 5 Drawing Sheets

(56) References Cited

U.S. PATENT DOCUMENTS

| | | |
|---|---|---|
| 9,593,762 B2 | 3/2017 | Lenczewski |
| 9,731,552 B2 * | 8/2017 | Puri .................... F16H 57/0471 |
| 2005/0261101 A1 * | 11/2005 | Yoshioka ............... B60K 17/16 |
| | | 475/231 |
| 2016/0160713 A1 | 6/2016 | Reedy |

* cited by examiner

AXLE ASSEMBLY WITH LUBRICATION PUMP

CROSS REFERENCE TO RELATED APPLICATIONS

The present application claims the benefit to U.S. Provisional Patent Application No. 62/800,102 filed on Feb. 1, 2019 and U.S. Provisional Patent Application No. 62/881,974 filed on Aug. 2, 2019, which are both incorporated herein by reference in their entireties.

FIELD

The present disclosure relates to an axle assembly having a lubrication pump.

BACKGROUND

Axle assemblies have internal cavities housing gear assemblies that must be properly lubricated to avoid premature wear and failure. The internal cavities must be filled with a certain level of lubrication fluid so that the gear assemblies can be lubricated as gear components rotate within the internal cavity. However, conventional axle assemblies often suffer from efficiency losses at the gear assembly that result from churning of the lubrication fluid. Excessive churning of the lubrication fluid can lead to inadequate lubrication coverage for gear components, resulting in premature wear.

Further, lubrication fluid often collects at the ring gear and the lubricant sump when an axle is used in conventional axle assemblies. As a result, these conventional axle assemblies experience churning losses and inefficiencies. It would therefore be advantageous to reduce the amount of lubrication fluid at the ring gear to improve efficiency of an axle assembly, while maintaining a proper wet sump of the axle assembly.

SUMMARY

In an embodiment, an axle assembly having a pair of axle half shafts and an axle housing having a center portion defining a sump portion. The axle assembly further includes a first clutch assembly including a first half having a plurality of teeth and a second half having a plurality of teeth, wherein the first half is selectively engaged to the second half. The axle assembly also includes a second clutch assembly disposed adjacent to the first clutch assembly, wherein the second clutch includes a gear and the gear is selectively engaged with the second half of the first clutch assembly. Yet further, the axle assembly includes a lubrication pump mounted in the axle housing and drivingly coupled to the second clutch assembly.

In some embodiments, the axle assembly includes one or more springs mounted between the first half and the second half of the first clutch assembly. The one or more springs may be configured to hold the second clutch assembly in compression.

In some embodiments, the axle assembly includes one or more bearings disposed between the spring and the second half of the first clutch assembly. The one or more bearings may be a thrust bearing.

In some embodiments, the first clutch assembly is a curvic clutch gear and each of the first half and the second half of the first clutch assembly have a plurality of teeth.

In an embodiment, the second clutch assembly is a friction clutch.

In some embodiments, one or more of the axle half shafts are disengaged from the axle assembly when the first half of the first clutch assembly is disengaged from the second half of the first clutch assembly.

In some embodiments, the lubrication pump is configured to pump lubricant fluid from the sump and the lubrication pump is drivingly activated when the second half of the first clutch assembly is engaged with the gear of the second clutch assembly.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION

It is to be understood that the disclosure may assume various alternative orientations and step sequences, except where expressly specified to the contrary. It is also understood that the specific devices and processes illustrated in the attached drawings, and described in the specification are simply exemplary embodiments of the concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the axle assembly with a disconnect lubrication pump disclosed herein may be used in automotive, off-road vehicle, all-terrain vehicle, construction, structural, marine, aerospace, locomotive, military, and machinery. Additionally, as a non-limiting example, the axle assembly with a disconnect lubrication pump disclosed herein may also be used in passenger vehicle, electric vehicle, hybrid vehicle, commercial vehicle, autonomous vehicles, semi-autonomous vehicles and/or heavy vehicle applications.

For description purposes, the terms "prime mover", "engine," "electric machine," and like terms, are used herein to indicate a power source. Said power source could be fueled by energy sources including hydrocarbon, electrical, solar, and/or pneumatic, to name but a few. Although typically described in a vehicle or automotive application, one skilled in the art will recognize the broader applications for this technology and the use of alternative power sources for driving a transmission including this technology.

Figure 1:
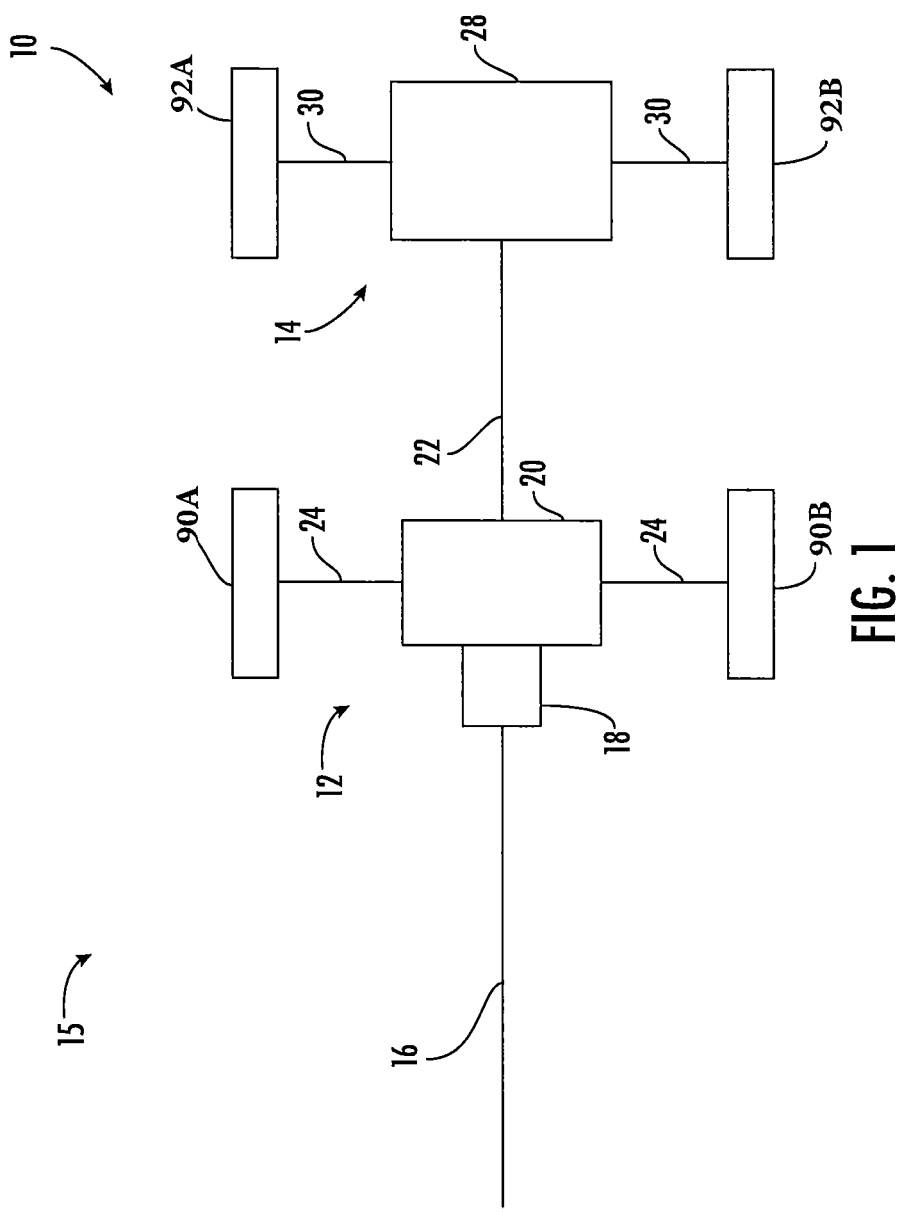
FIG. 1 is a schematic top, plan view of a portion of a vehicle having a tandem axle assembly according to an embodiment of the disclosure.
Figure 2:
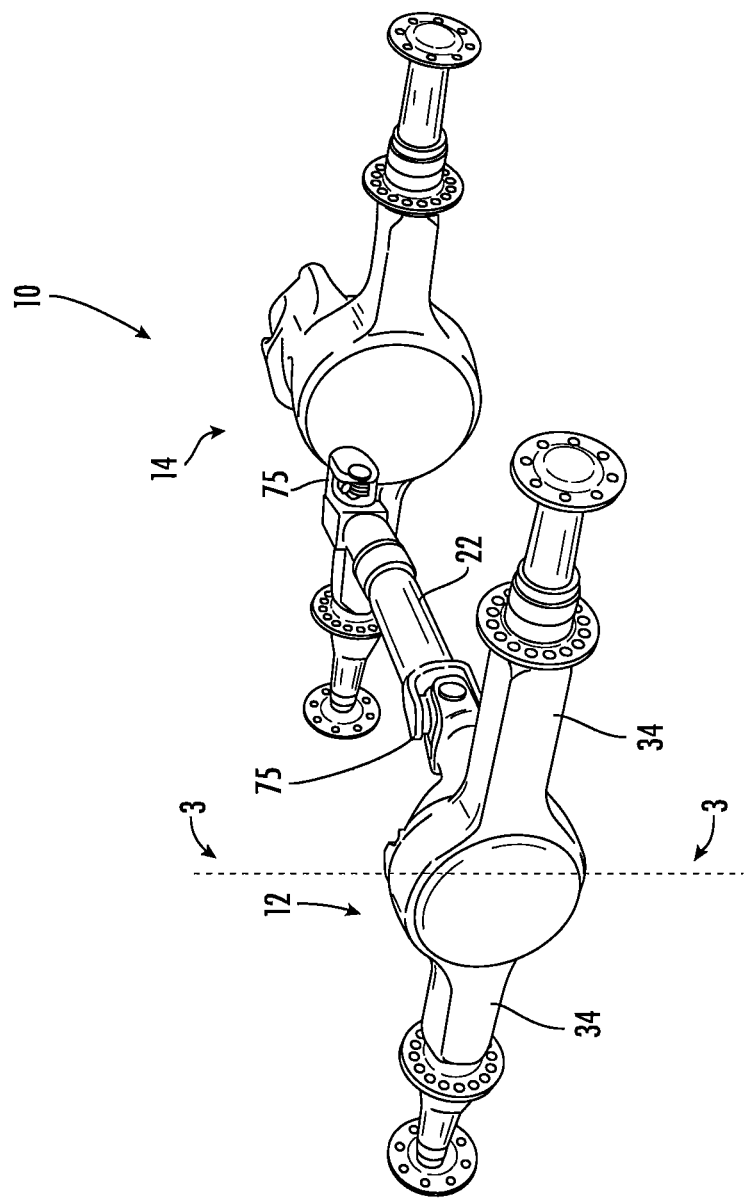
FIG. 2 is a schematic perspective view of the tandem axle assembly illustrated in FIG. 1.

FIG. 1 is a schematic top-plan view of a portion of a vehicle 15 having a tandem axle assembly 10 according to an embodiment of the disclosure. In other embodiments, a greater number of axle assemblies may be provided. As best seen in FIGS. 1 and 2, the tandem axle assembly 10 may include a forward axle assembly 12 and a rear axle assembly 14. The forward axle assembly 12 and the rear axle assembly 14 may be drive axle assemblies. The drive axle assemblies may provide torque to one or more wheel assemblies that may be rotatably supported on the drive axle assemblies.

In a tandem axle configuration, the forward axle assembly 12 may be connected in series with the rear axle assembly 14. The forward axle assembly 12 may be spaced apart from the rear axle assembly 14. The forward axle assembly 12 may be rotatingly disengaged from the tandem axle assembly 10. Rotational energy is provided to the tandem axle assembly 10 through an input shaft 16 that is rotated by a prime mover.

An inter-axle differential 18 is located on the forward axle assembly 12 and is configured to divide the rotational power/torque generated by the prime mover between the forward axle assembly 12 and the rear axle assembly 14. The inter-axle differential 18 is connected to the input shaft 16 and is selectively drivingly connected to a forward axle differential assembly 20 and an intermediate shaft 22. In some embodiments, the inter-axle differential 18 may be a bevel gear-style differential. One of ordinary skill in the art would understood that other differential arrangements may be used and that the inter-axle differential 18 may be provided with the rear axle assembly 14.

As shown in FIG. 1, the forward axle assembly 12 includes a pair of forward axle half shafts 24 on which one or more forward wheels 90A, 90B may be mounted. The pair of forward axle half shafts 24 extend from opposing ends of the forward axle differential assembly 20.

One end of the intermediate shaft 22 is drivingly connected to the inter-axle differential 18 and the other end is drivingly connected to the rear axle assembly 14 providing rotational power thereto. As illustrated in FIGS. 1 and 2, the intermediate shaft 22 extends from the forward axle assembly 12 to a rear axle differential assembly 28 of the rear axle assembly 14. The intermediate shaft 22 may be coupled to a portion of the forward axle assembly 12 and a portion of the rear axle assembly 14 at opposing ends via couplings 75, such as universal joints, that may allow the forward axle assembly 12 and the rear axle assembly 14 to move with respect to each other.

The rear axle assembly 14 further includes a pair of rear axle half shafts 30 on which one or more rear wheels 92A, 92B may be mounted. The pair of rear axle half shafts 30 extend from opposing ends of the rear axle differential assembly 28.

Figure 3:
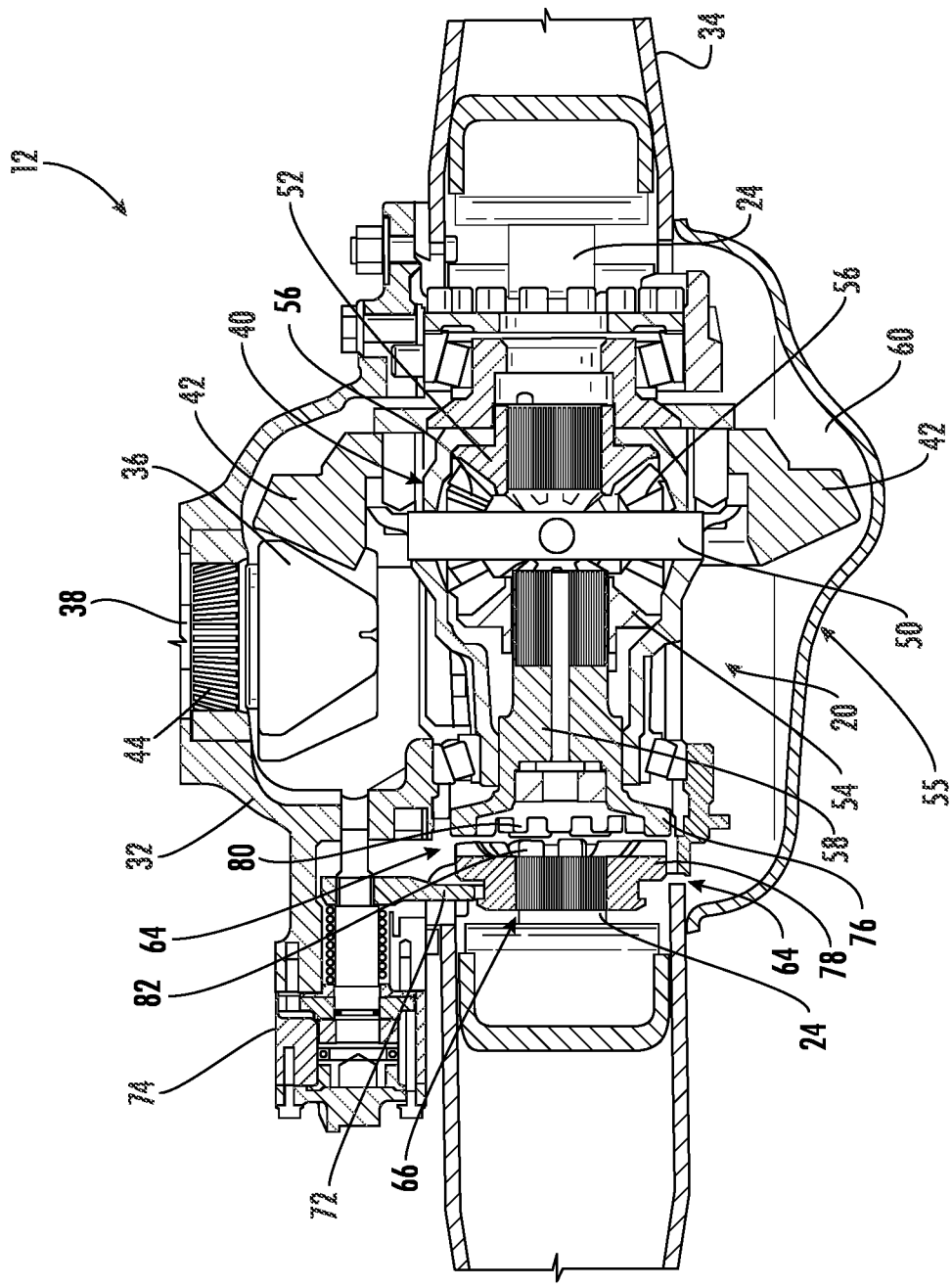
FIG. 3 is a schematic sectional view along line 3-3 of FIG. 2.

FIG. 3 is a schematic sectional view of the forward axle assembly 12 of the tandem axle assembly 10 illustrated in FIG. 2. The forward axle assembly 12 may include an axle housing 32, a pair of forward axle half shaft housings 34, and the forward axle differential assembly 20. The axle housing 32 may have a size and a shape to receive and/or retain at least a portion of the forward axle differential assembly 20 therein. Even though a forward axle assembly 12 is illustrated in the embodiment illustrated in FIG. 3, any axle assembly can be used in other embodiments of the disclosure.

The axle housing 32 may include a center portion 55 disposed proximate the center of the axle housing 32. The center portion 55 may define a cavity that may receive the forward axle differential assembly 20.

As best seen in FIG. 3 and as a non-limiting example, at least a portion of each of the pair of forward axle half shaft housings 34 may be integrally connected to opposing ends of the axle housing 32. The pair of forward axle half shaft housings 34 may be of a size and shape to receive at least a portion of the pair of forward axle half shafts 24.

The forward axle differential assembly 20 includes one or more pinion gears 36 coupled to one more pinion gear shafts 38 extending into at least a portion of the axle housing 32. The pinion gear shafts 38 transmit an amount of rotational energy from a prime mover to the forward axle differential assembly 20. The pinion gear shafts 38 may be supported by one or more bearings 44 for rotation.

Integrally connected to at least a portion of a forward axle differential case assembly 40 of the forward axle differential assembly 20 are one or more ring gears 42. The one or more ring gears 42 include a plurality of teeth that may meshingly engage with one or more teeth on the pinion gears 36. It is within the scope of this disclosure and as a non-limiting example that the ring gears 42 may be configured to splash an amount of lubrication fluid onto the various components of the forward axle differential assembly 20, such as the bearings 44, which may require lubrication and/or cooling when in operation. As a non-limiting example, the lubrication fluid may be an oil composition.

A spider shaft 50 extends through the interior of the forward axle differential case assembly 40. As best shown in FIG. 3 and as a non-limiting example, the spider shaft 50 may be interposed between a first side gear 52 and a second side gear 54. The first side gear 52 is meshingly engaged with one or more spider gears 56. The first side gear 52 may be connected to one of the pair of forward axle half shafts 24 and the second side gear 54 may be splined to a stub shaft 58.

As best shown in FIG. 3, a lower region of the center portion 55 may at least partially define a sump portion 60 that is located beneath the forward axle differential assembly 20. The sump portion 60 is configured to hold an amount of lubrication fluid through which the one or more ring gears 42 may rotate to lubricate and cool various components on the forward axle assembly 12, such as the forward axle differential assembly 20. Splashed lubrication fluid may flow down the sides of the center portion 55 and may flow over internal components of the forward axle assembly 12 and gather in the sump portion 60.

It is advantageous to reduce the amount of lubrication fluid in the sump portion 60 to reduce drag torque due to the churning of the one or more ring gears 42 through the lubrication fluid in the sump portion 60 and to improve vehicle fuel economy. However, sufficient lubrication fluid must be maintained to lubricate and cool the necessary components in the forward axle assembly 12.

As illustrated in FIG. 3, a first clutch assembly 64 is in driving engagement with the stub shaft 58. The first clutch assembly 64 may move along the stub shaft 58 for selectively connecting the stub shaft 58 with one of the pair of forward axle half shafts 24. This allows torque to be transmitted through the forward axle assembly 12 when the forward axle assembly 12 is engaged. In a non-limiting example, the first clutch assembly 64 may be a curvic clutch gear.

As illustrated in FIG. 3 and as a non-limiting example, a second clutch assembly 66 may be drivingly engaged with the first clutch assembly 64. The second clutch assembly 66 includes a drive gear 68 that is configured to selectively activate a lubrication pump 70 mounted within the axle housing 32. It is within the scope of this disclosure and as a non-limiting example, the second clutch assembly 66 may be a friction clutch having a plurality of disks.

The lubrication pump 70 may be used to pump lubrication fluid from the sump portion 60 to the rotating/moving parts of the forward axle assembly 12 when the forward axle assembly 12 is rotatingly disengaged or when there is an insufficient amount of splashed lubrication fluid. This aids in reducing the amount of lubrication fluid in the center portion 55 in order to reduce churning and to improve the efficiency of the axle assembly 10. The lubrication fluid may be pumped and stored in various locations on the forward axle assembly 12, such as, but not limited to a reserve tank (not shown).

The lubrication pump 70 may be any type of lubrication pump. In some embodiments, the lubrication pump 70 may be a gerotor pump, a gear pump, a crescent pump, a vane pump, or the like. As a non-limiting example, the lubrication pump 70 may include a piston (not shown) that can be configured to move between an extended position and a retracted position when the lubrication pump 70 is active.

A shift fork 72 may be disposed proximate to the first clutch assembly 64 and may be configured to selectively move the first clutch assembly 64 to selectively disconnect the stub shaft 58 and one of the pair of forward axle half shafts 24 so that they do not rotate together. As a result, lubricant churning losses are minimized or prevented.

As best seen in FIG. 3 and as a non-limiting example, the shift fork 72 may be drivingly engaged with one or more actuators 74 to position the shift fork 72, and thus the first clutch assembly 64. When the forward axle assembly 12 is rotatingly disengaged, the one more actuators 74 position the shift fork 72 so that the shift fork 72 moves the first clutch assembly 64 such that the stub shaft 58 is disconnected from one of the pair of forward axle half shafts 24. The one or more actuators 74 may be any type of actuator mechanism. In some embodiments, the one or more actuators 74 may be one or more ball ramps, one or more solenoids, one or more electric actuators, one or more linear actuators, one or more pneumatic actuators, one or more hydraulic actuators, one or more electro-mechanical actuators, and/or one or more electro-magnetic actuators.

Figure 4:
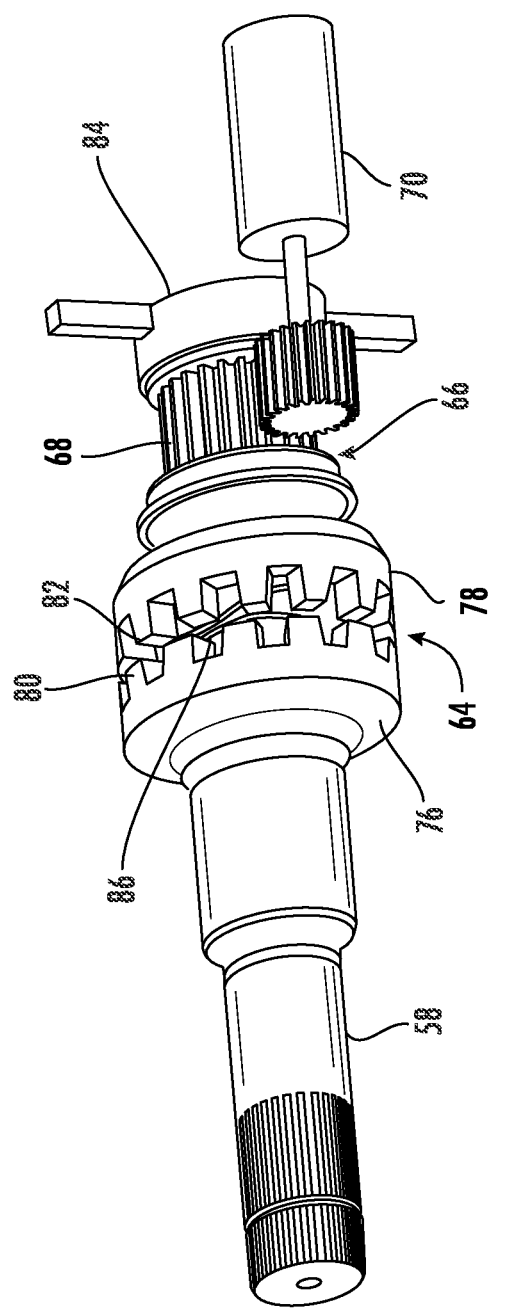
FIG. 4 is a schematic perspective view of a portion of the tandem axle assembly illustrated in FIGS. 1-3.

FIG. 4 is a schematic perspective view of a portion of the forward axle assembly 12 illustrated in FIG. 2. As best seen in FIG. 3 and as a non-limiting example, the first clutch assembly 64 may be disposed proximate and directly adjacent to the stub shaft 58. The first clutch assembly 64 may include a first half 76 and an opposing second half 78. The first half 76 may have a plurality of teeth or splines 80 that are engageable with a plurality of correspondingly shaped teeth or splines 82 on the second half 78. When the axle assembly 10 is in a 6×4 mode, the first half 76 and the second half 78 of the first clutch assembly 64 are engaged to allow torque to be transmitted through the axle assembly 10.

One of either the first half 76 or the second half 78 of the clutch assembly 64 are engaged when moved by the shift fork 72, which allows torque to be transmitted through the forward axle assembly 12. When one of either the first half 76 or the second half 78 are disengaged by the shift fork 72, the forward axle assembly 12 is rotatingly disengaged from the axle assembly 10.

As illustrated in FIG. 4 and as a non-limiting example, the second half 78 of the first clutch assembly 64 may be disposed proximate and directly adjacent to the second clutch assembly 66, wherein the second clutch assembly 66 is disposed proximate and directly adjacent to a housing mount 84.

Figure 5:
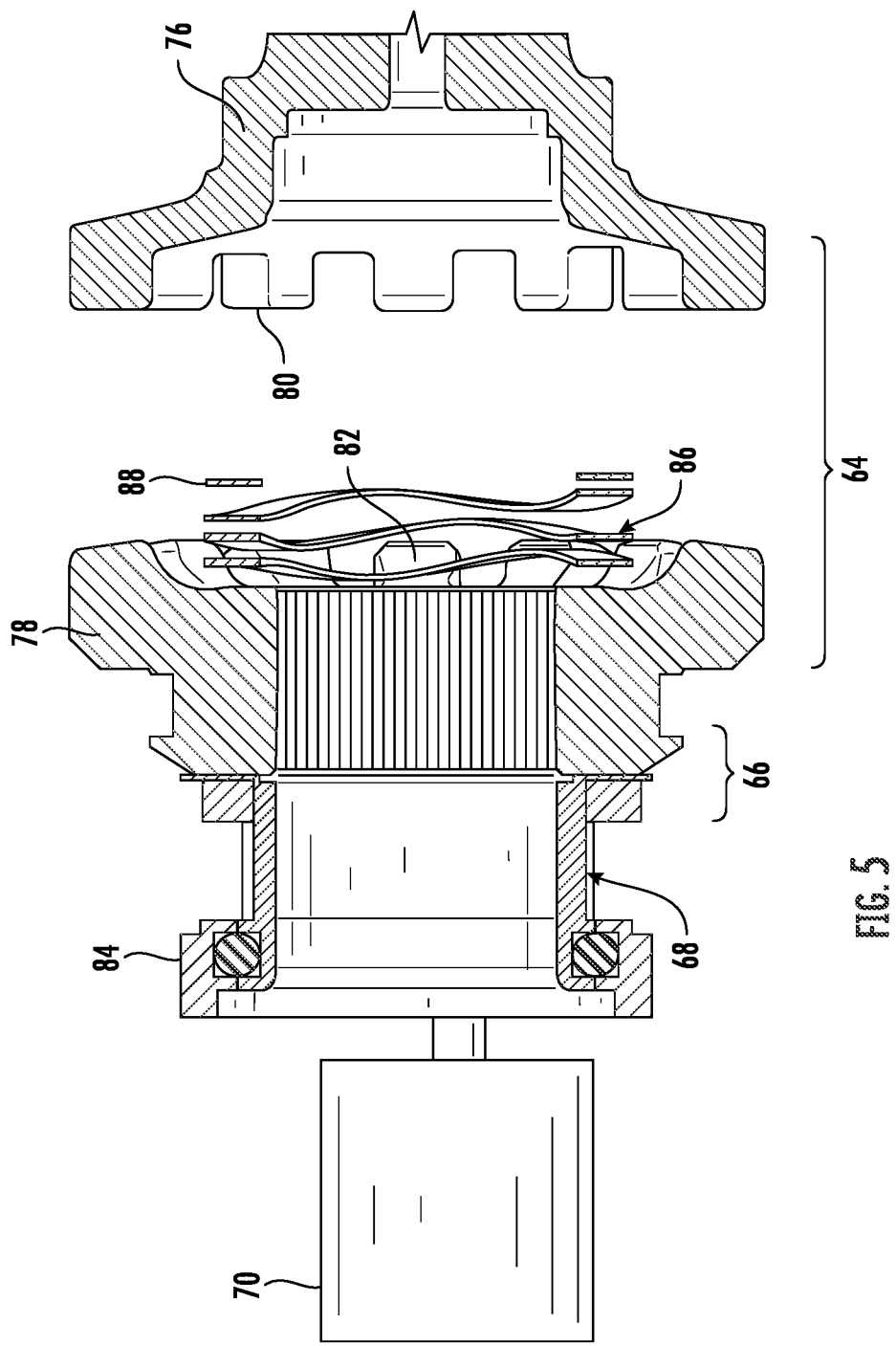
FIG. 5 is a schematic sectional view the portion of the tandem axle assembly of FIG. 4.

FIG. 5 is a schematic sectional view of the forward axle assembly 12 illustrated in FIG. 4. When the plurality of teeth 80 on the first half 76 of the first clutch assembly 64 are disengaged from the plurality of teeth 82 on the second half 78 of the first clutch assembly 64, the second half 78 engages with a side portion of the drive gear 68. The second clutch assembly 66 (i.e. friction clutch) then drivingly activates the lubrication pump 70. This shifts the axle assembly 10 into the 6×2 mode.

As best seen in FIGS. 4 and 5 and as a non-limiting example, one or more biasing members 86, such as springs, may be positioned between the first half 76 and the second half 78 of the first clutch assembly 64. The one or more biasing members 86 may provide the necessary force to the second clutch assembly 66 to hold it in compression. In an alternative embodiment, a shift fork, instead of the biasing member 86, may be mounted between the first half 76 and the second half 78 of the first clutch assembly 64.

As best seen in FIG. 5 and as a non-limiting example, one or more bearings 88 may be positioned between the one or more springs 86 and the first half 76 of the first clutch assembly 64. The one or more bearings 88 may allow relative motion between the first half 76 and the second half 78 of the first clutch assembly 64 and allow the forward axle assembly 12 to maintain its ability to differentiate. In some embodiments of the disclosure, the one or more bearings 88 may be a thrust bearing, a thrust washer, or a bushing.

The lubrication pump 70 may be driven by one of the pair of forward axle half shafts 24 and the first clutch assembly 64 via the second clutch assembly 66 so that lubrication fluid may be reduced at the sump portion 60 to improve efficiency of the forward axle assembly 12 when the forward axle assembly 12 is rotatingly disengaged from the axle assembly 10, while maintaining a normal wet sump portion 60 when the forward axle assembly 12 is engaged.

In accordance with an embodiment of the disclosure, the present disclosure may relate to any axle configuration having one or more axles, such as, but not limited to a tandem axle assembly, a tridem axle assembly, a single axle assembly, and/or an electric axle assembly. As a non-limiting example, when towing a single axle, the axle may be disconnected and lubrication fluid may be pumped out to decrease losses during towing. As another non-limiting example, a single axle may be disconnected and lubrication fluid may be pumped out for electric only operations in order to improve efficiency.

It is to be understood that the various embodiments described in this specification and as illustrated in the attached drawings are simply exemplary embodiments illustrating the concepts as defined in the claims. As a result, it is to be understood that the various embodiments described and illustrated may be combined to from the concepts defined in the appended claims.

In accordance with the provisions of the patent statutes, the present disclosure has been described to represent what is considered to represent the preferred embodiments. However, it should be noted that this disclosure can be practiced in other ways than those specifically illustrated and described without departing from the spirit or scope of this disclosure.

What is claimed is:

1. An axle assembly comprising:
a pair of axle half shafts;
an axle housing having a center portion defining a sump portion;
a first clutch assembly including a first half having a plurality of teeth and a second half having a plurality of teeth, wherein the plurality of teeth on the first half are selectively engaged with the plurality of teeth on the second half;
a second clutch assembly disposed adjacent to the first clutch assembly, wherein the second clutch includes a drive gear and the drive gear is selectively engaged with the second half of the first clutch assembly;
a lubrication pump drivingly coupled to the second clutch assembly; and
one or more springs positioned between the first half and the second half of the first clutch assembly, wherein the one or more springs are configured to hold the second clutch assembly in compression.

2. The axle assembly of claim 1, further comprising one or more bearings disposed between the one or more spring and the second half of the first clutch assembly.

3. The axle assembly of claim 2, wherein the one or more bearings comprise a thrust bearing, a thrust washer, a bushing, or any combinations thereof.

4. The axle assembly of claim 1, wherein the first clutch assembly comprises a curvic clutch gear and the second clutch assembly comprises a friction clutch.

5. The axle assembly of claim 1, wherein the lubrication pump is a gerotor pump.

6. The axle assembly of claim 1, wherein the second clutch assembly drivingly activates the lubrication pump when the plurality of teeth on the first half of the first clutch assembly are disengaged from the plurality of teeth on the second half of the first clutch assembly and when the second half of the first clutch assembly is engaged with at least a portion of the second clutch assembly.

7. The axle assembly of claim 6, wherein the lubrication pump reduces the amount of lubrication fluid at the sump portion.

8. An axle assembly comprising:
a pair of axle half shafts;
an axle housing having a center portion defining a sump portion;
a first clutch assembly including a first half having a plurality of teeth and a second half having a plurality of teeth, wherein the plurality of teeth on the first half are selectively engaged with the plurality of teeth on the second half;
a second clutch assembly disposed adjacent to the first clutch assembly, wherein the second clutch includes a drive gear and the drive gear is selectively engaged with the second half of the first clutch assembly, and wherein the first clutch assembly comprises a curvic clutch gear and the second clutch assembly comprises a friction clutch; and
a lubrication pump drivingly coupled to the second clutch assembly.

9. The axle assembly of claim 8, further comprising one or more springs positioned between the first half and the second half of the first clutch assembly, wherein the one or more springs are configured to hold the second clutch assembly in compression.

10. The axle assembly of claim 9, further comprising one or more bearings disposed between the one or more spring and the second half of the first clutch assembly.

11. The axle assembly of claim 10, wherein the one or more bearings comprise a thrust bearing, a thrust washer, a bushing, or any combinations thereof.

12. The axle assembly of claim 8, wherein the lubrication pump is a gerotor pump.

13. The axle assembly of claim 8, wherein the second clutch assembly drivingly activates the lubrication pump when the plurality of teeth on the first half of the first clutch assembly are disengaged from the plurality of teeth on the second half of the first clutch assembly and when the second half of the first clutch assembly is engaged with at least a portion of the second clutch assembly.

14. The axle assembly of claim 13, wherein the lubrication pump reduces the amount of lubrication fluid at the sump portion.

15. An axle assembly comprising:
a pair of axle half shafts;
an axle housing having a center portion defining a sump portion;
a first clutch assembly including a first half having a plurality of teeth and a second half having a plurality of teeth, wherein the plurality of teeth on the first half are selectively engaged with the plurality of teeth on the second half;
a second clutch assembly disposed adjacent to the first clutch assembly, wherein the second clutch includes a drive gear and the drive gear is selectively engaged with the second half of the first clutch assembly; and
a lubrication pump drivingly coupled to the second clutch assembly, wherein the second clutch assembly drivingly activates the lubrication pump when the plurality of teeth on the first half of the first clutch assembly are disengaged from the plurality of teeth on the second half of the first clutch assembly and when the second half of the first clutch assembly is engaged with at least a portion of the second clutch assembly.

16. The axle assembly of claim 15, further comprising one or more springs positioned between the first half and the second half of the first clutch assembly, wherein the one or more springs are configured to hold the second clutch assembly in compression.

17. The axle assembly of claim 15, further comprising one or more bearings disposed between the one or more spring and the second half of the first clutch assembly.

18. The axle assembly of claim 15, wherein the first clutch assembly comprises a curvic clutch gear and the second clutch assembly comprises a friction clutch.

19. The axle assembly of claim 15, wherein the lubrication pump is a gerotor pump.

20. The axle assembly of claim 15, wherein the lubrication pump reduces the amount of lubrication fluid at the sump portion.

\* \* \* \* \*